No. 679,294. Patented July 30, 1901.
W. S. CANNADAY.
VEHICLE WHEEL.
(Application filed Nov. 14, 1900.)
(No Model.)

Witnesses
Edwin G. McKee
B. G. Foster

Winfield S. Cannaday Inventor
By C. G. Siggers
Attorney

UNITED STATES PATENT OFFICE.

WINFIELD S. CANNADAY, OF FLORENCE, ALABAMA, ASSIGNOR OF ONE-THIRD TO ANDREW B. PAXTON, OF ALEXANDRIA, INDIANA.

VEHICLE-WHEEL.

SPECIFICATION forming part of Letters Patent No. 679,294, dated July 30, 1901.

Application filed November 14, 1900. Serial No. 36,511. (No model.)

*To all whom it may concern:*

Be it known that I, WINFIELD S. CANNADAY, a citizen of the United States, residing at Florence, in the county of Lauderdale and State of Alabama, have invented a new and useful Vehicle-Wheel, of which the following is a specification.

The present invention relates to vehicle-wheels; and one object thereof is to provide a yielding connection between the spokes and hub which will take up the jars and shocks imparted to the wheel, and thus relieve the vehicle-body, and consequently the occupant, from the same.

A further object is to so construct the wheel that the several elements are accessible for the purpose of adjustment and may be readily and easily separated should it become necessary to replace or repair any of the parts.

In carrying out the above objects the following-described construction is preferred; but it will be understood that the invention is not to be limited to this construction and may be changed and modified within the scope of the appended claims. The preferred form of construction is also illustrated in the accompanying drawings, in which—

Figure 2:
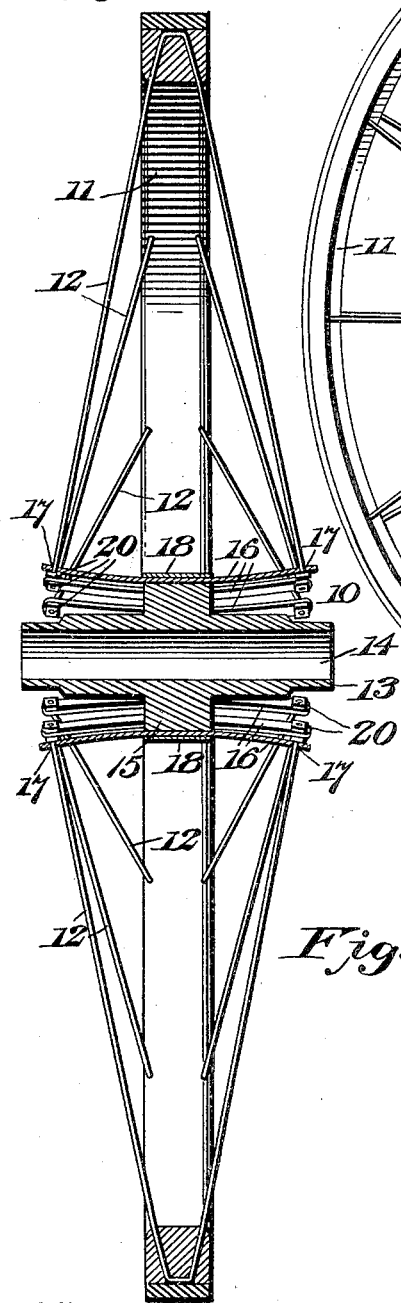
Figure 1:
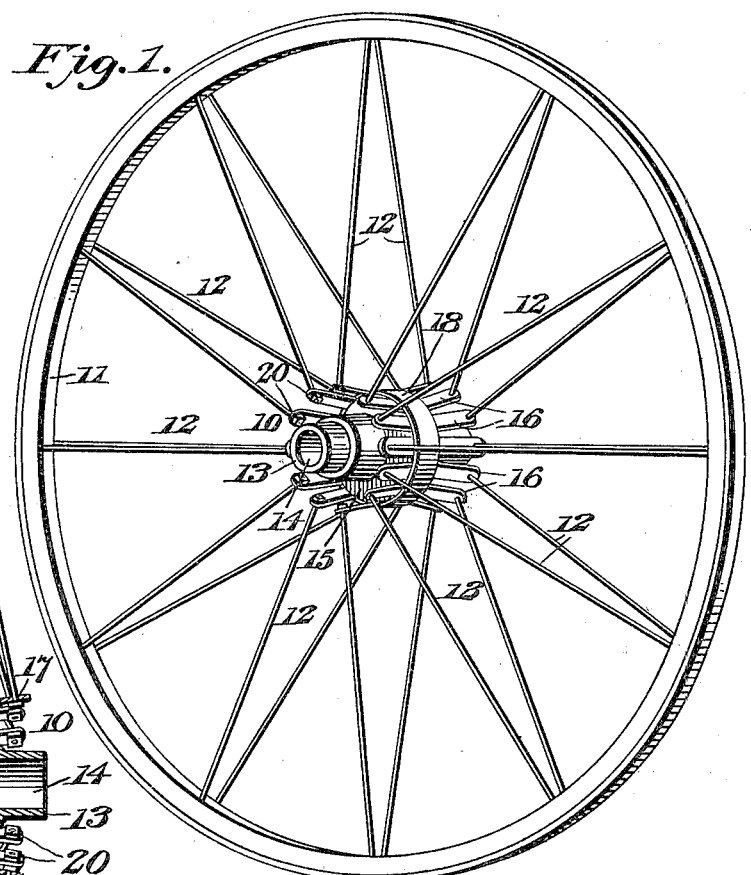
Figure 3:
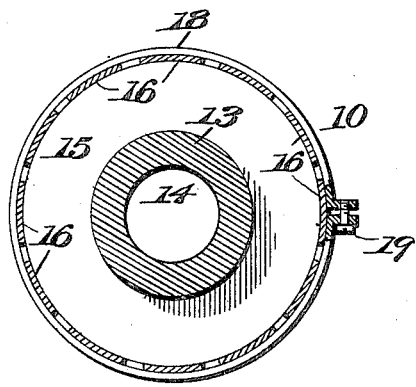

Figure 1 is a perspective view of a vehicle-wheel embodying the invention. Fig. 2 is a vertical section through the same, and Fig. 3 is an enlarged cross-section through the hub.

Similar numerals of reference designate corresponding parts in the several figures of the drawings.

In the drawings the numeral 10 designates the improved hub, 11 the felly and tire, and 12 the spokes connecting the same. The hub 10 comprises a preferably solid body 13, having the usual spindle-receiving opening 14 and provided on its exterior face with a central annular bearing-flange 15, having a flat outer face. Arranged transversely across this bearing-flange is a plurality of flat leaf-springs 16, which project on both sides of the flange and are provided in their opposite ends with openings 17 for the reception of the spokes 12. To hold these springs 16 in place upon the bearing-flange, a retaining-band 18 surrounds the same and clamps them securely to said flange, this band having its ends detachably secured together by an adjusting-screw 19 or other suitable fastener. The inner ends of the spokes 12 are passed through the openings 17 in the springs and are adjustably secured therein by means of the nuts 20, screwed thereon. The opposite ends of these spokes are secured to the felly. A very simple and efficient manner of constructing the spokes is to make each pair of a single rod, which is passed through the felly and has its ends secured to the opposite ends of the same spring, as clearly shown in Fig. 2.

The operation of the wheel will be evident. When it strikes an obstruction or unevenness, the jar occasioned thereby will be transmitted through the spokes to the springs, which will give, and thus take up the shock and not transmit it to the hub. By having the springs spaced from the hub considerable movement will be allowed. The nuts of the spokes are in a readily-accessible position, and by tightening or loosening them the proper tension will be given the spokes and the wheel accordingly adjusted. Should any of the parts become broken or worn from any cause, by loosening the retaining-band 18 such part or parts may be quickly removed and replaced.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having now described my invention, what I claim as new, and desire to secure by Letters Patent, is—

1. In a vehicle-wheel, a hub, a plurality of leaf-springs arranged longitudinally along the hub, and each having one portion secured to the hub and a free end portion, and spokes secured to said free end portions.

2. In a vehicle-wheel, a hub, a plurality of leaf-springs arranged longitudinally of and clustered about the hub, said springs having free ends, and spokes secured to said free ends.

3. In a vehicle-wheel, a hub carrying a plurality of independent leaf-springs secured intermediate their ends, and spokes secured to the opposite ends of said springs.

4. In a vehicle-wheel, a hub carrying a plurality of independent leaf-springs secured intermediate their ends, and spokes detachably and adjustably secured to the opposite ends of said springs.

5. In a vehicle-wheel, a hub, a plurality of leaf-springs detachably secured intermediate their ends to said hub, and spokes secured to the opposite ends of said springs.

6. In a vehicle-wheel, a hub having an annular bearing-flange, a plurality of leaf-springs secured to said flange and projecting on both sides thereof, and spokes secured to the projecting ends of said springs.

7. In a vehicle-wheel, a hub having an annular bearing-flange, a plurality of leaf-springs arranged upon said bearing-flange, a clamping-band surrounding the leaf-springs, and spokes secured to said springs.

8. In a vehicle-wheel, a hub having a centrally-arranged annular flange on its exterior face, a plurality of flat leaf-springs arranged upon said flange and having their ends projecting beyond the opposite side edges thereof, a clamping-band surrounding said springs, and spokes secured to the opposite projecting ends of said springs.

In testimony that I claim the foregoing as my own I have hereto affixed my signature in the presence of two witnesses.

WINFIELD S. CANNADAY.

Witnesses:
L. D. HOLIWAY,
CHARLES A. WARE.